3,836,546
PROCESS FOR THE PRODUCTION OF
1-NITROANTHRAQUINONES
Walter Frey, Muttenz, Basel-Land, and Istvan Toth, Basel, Switzerland, assignors to Sandoz Ltd., Basel, Switzerland
No Drawing. Filed Jan. 14, 1971, Ser. No. 106,594
Claims priority, application Switzerland, Jan. 30, 1970, 1,310/70; Aug. 26, 1970, 12,741/70
Int. Cl. C07c 79/10; C09b 1/00
U.S. Cl. 260—369    10 Claims

ABSTRACT OF THE DISCLOSURE

Process for the production of 1-nitroanthraquinones, especially of 1-nitroanthraquinone, in good yield and high purity by nitration of anthraquinones, particularly anthraquinone, with nitric acid and in the presence of (preferably highly concentrated) phosphoric acid and optionally of sulfuric acid or sulfates. Good results are obtained with an excess of fuming nitric acid and of concentrated phosphoric acid.

---

The production of 1-nitroanthraquinone by nitration of anthraquinone with nitric acid is known. In the presence of sulphuric acid substantial amounts of by-products, in the main dinitroanthraquinone along with 2-nitroanthraquinone, are formed. Moreover, a certain amount of anthraquinone remains unreacted in the reaction mixture. Purification of the resulting 1-nitroanthraquinone is laborious and increases the cost of the process.

It has now been found that 1-nitroanthraquinones can be produced very economically in a notably high degree of purity by nitration of anthraquinones in the presence of phosphoric acid.

The phosphoric acid is employed advantageously in amounts of at least 1 mole, preferably 10 to 40 moles, per mole of anthraquinone. It contains preferably more than 61% phosphorus pentoxide, optimally more than 70%, the acid content of the phosphoric acid being calculated as phosphorus pentoxide content. Accordingly, polyphosphoric acids and phosphorus pentoxide, as well as phosphoric acid itself can be used. (These and the percentage values in the following are to be understood as percentages by weight).

The preferred nitrating agent is nitric acid and it is employed in amounts of at least 1 mole, more especially 3 to 13 moles and optimally 4 to 8 moles, relative to 1 mole of anthraquinone. It is of special advantage to employ nitric acid of 90–100%, preferably 95–98%, strength. Nitric acid of 40 to 90% strength can be used, but it means that highly concentrated phosphoric acid or phosphorus pentoxide has to be employed for the reaction. In place of nitric acid, water soluble nitrates, such as ammonium nitrate, can be used as nitrating agents.

In addition, the reaction mixture may contain sulphuric acid. This can be present as the acid itself, as sulphur trioxide or as an alkali-metal sulphate, for example sodium sulphate, in amounts of about 0.01 to 0.1 mole, especially 0.03 to 0.05 mole, per mole of anthraquinone. Alternatively, the sulphur trioxide can be added as a dimethyl formamide-sulphur trioxide complex.

It is desirable for the mixture to contain not more than 16%, preferably not more than 5%, water at the commencement of the reaction.

The reaction temperature may vary within wide limits, i.e. from about 0° to the boiling point of the reaction mixture under normal pressure, or at higher temperatures, e.g. to 125° C., under increased pressure. It is, however, preferable to react the anthraquinone to the 1-nitroanthraquinone at 30–90° C., or more especially at 40–70° C. As water is formed in the course of the reaction, the rate of reaction can be accelerated by adding further nitric, phosphoric or polyphosphoric acid and/or phosphorus pentoxide.

The mixture can be held at the reaction temperature until all or almost all the anthraquinone has been converted into 1-nitroanthraquinone. But frequently it is of advantage to terminate the reaction when a substantial proportion, e.g. 50 to 90%, of the starting anthraquinone has reacted. The 1-nitroanthraquinone formed is then isolated and the filtrate used for reacting a fresh batch, if necessary after adjustment to the initial acid concentration by the addition of further nitric and phosphoric acid.

The reaction product can be isolated by normal methods, e.g. by cooling the reaction mixture and filtration. It is then washed with water if necessary and finally dried. The product consists essentially of 1-nitroanthraquinone and contains no more than small amounts of starting material and by-products.

In the Examples the parts and percentages are by weight and the temperatures in degrees centigrade.

EXAMPLE 1

A mixture of 13 parts of anthraquinone and 100 parts of crystallized 98% phosphoric acid is raised to 45°. At this temperature 20 parts of 98% nitric acid and 0.5 part of sulphur trioxide are added with stirring in the space of 30 minutes. Stirring is continued for 24 hours at 40–45°. A thin layer chromatogram shows that the reaction to 1-nitroanthraquinone has progressed to approximately 50%. The reaction mixture is allowed to cool to 25°, on which the product settles out. It is filtered off with suction, washed with water until the filtrate is neutral, and dried. It contains 96% 1-nitroanthraquinone and 4% anthraquinone. The yield is 7 parts. The filtrate contains anthraquinone along with a little 1-nitroanthraquinone. It can be used again after the water content has been decreased to the starting value by the addition of polyphosphoric acid of 83–84% phosphorus pentoxide content.

EXAMPLE 2

13 Parts of anthraquinone are entered at 20–25° into a mixture of 100 parts of 98% phosphoric acid and 30 parts of 98% nitric acid at 20–25°. The mixture is heated to 45° and stirred for 6 hours. The reaction is allowed to continue until 25% of the anthraquinone had reacted. The resulting 1-nitroanthraquinone contains only traces of dinitroanthraquinones.

EXAMPLE 3

13 parts of anthraquinone are entered at room temperature into a mixture of 50 parts of 98% nitric acid and 50 parts of 84% phosphoric acid. The mixture is raised slowly to 70° and stirred for 13 hours at this temperature. During the reaction the anthraquinone goes completely into solution in the mixture. The 1-nitroanthraquinone formed, however, together with a small amount of dinitroanthraquinones, settles out in crystalline form, while 2-nitroanthraquinone along with a substantial amount of dinitroanthraquinone remains in solution. The reacted amount is 50%. The isolated 1-nitroanthraquinone contains 3% anthraquinone and only traces of dinitroanthraquinone.

EXAMPLE 4

In the course of 30 minutes 45 parts of 98% nitric acid are added to a mixture of 22.4 parts of anthraquinone and 180 parts of 100% phosphoric acid. The mixture is reacted for 16 hours at 45°. After filtration through a G3 glass suction filter, washing with water and drying, 20.5 parts of a product are obtained which consists of 90% 1-nitroanthraquinone (70% of theory), 1% 2-nitroanthraquinone, 8% dinitroanthraquinone and 1% anthraquinone.

EXAMPLE 5

The reaction mixture is set with 22.4 parts of anthraquinone, 180 parts of 99.5% phosphoric acid and 36 parts of 98% nitric acid and it is reacted for 22 hours at 45°. The product (17.2 parts) is isolated as in Example 4; it consists of 90% 1-nitroanthraquinone, 2% 2-nitroanthraquinone, 5% dinitroanthraquinones and 3% anthraquinone.

EXAMPLE 6

Proceeding as in Example 4, 22.4 parts of anthraquinone, 180 parts of 101.5% phosphoric acid and 36 parts of 98% nitric acid are reacted for 18 hours at 45°. The yield is 22.6 parts of a product which, after drying, consists of 87% 1-nitroanthraquinone, 2.5% 2-nitroanthraquinone, 8% dinitroanthraquinone, 2% anthraquinone and 0.5% of other by-products.

EXAMPLE 7

Employing again the procedure of Example 4, 22.4 parts of anthraquinone, 180 parts of 99% phosphoric acid and 27 parts of 98% nitric acid are reacted for 16 hours at 45°. After filtration and drying, the yield is 18 parts of a product consisting of 90% 1-nitroanthraquinone, 8% dinitroanthraquinones and minor amounts of 2-nitroanthraquinone and anthraquinone.

In the following table further examples are given of reactants and reaction conditions for the production of 1-nitroanthraquinone in conformity with this invention.

The percentage values for the yields in column (a) represent the amount of the product obtained by the conventional method of isolation by unloading onto ice. The yields in column (b) are the amounts of the significantly purer product obtained by filtration of the reacted mixture.

Having thus disclosed the invention what we claim is:

1. A process for the production of 1-nitroanthraquinone which comprises reacting anthraquinone with nitric acid or a water soluble salt thereof at a temperature of 0° to 125° C. and in the presence of phosphoric acid, at least 1 mole of the nitrating agent and at least 1 mole of phosphoric acid being employed per mole of anthraquinone and no more than 16 percent by weight water being present at the commencement of the reaction.

2. A process according to claim 1 wherein the nitration is initiated in a reaction medium containing at most 5 percent by weight of water.

3. A process according to claim 1 wherein the nitrating agent is nitric acid.

4. A process according to claim 3 wherein the reaction medium contains from 3 to 13 moles of nitric acid per mole of anthraquinone.

5. A process according to claim 3 wherein the nitric acid is in excess of 40 percent strength.

6. A process according to claim 1 wherein the reaction medium contains from 10 to 40 moles of phosphoric acid per mole of anthraquinone.

7. A process according to claim 1 wherein the nitration is effected at a temperature in the range from 30° to 90° C.

8. A process according to claim 1 wherein the phosphoric acid has a phosphorus pentoxide content in excess of 61 percent by weight.

9. A process according to claim 6 wherein the reaction medium contains from 4 to 8 moles of nitric acid per mole of anthraquinone.

10. A process according to claim 9 wherein the nitration is effected at a temperature within the range of from 40° to 70° C.

TABLE

| Ex. No. | Parts anthraquinone | Phosphoric acid Parts | Phosphoric acid Concentration, percent | Nitric acid Parts | Nitric acid Concentration, percent | Temperature, degrees | Time in hours | Molar ratio anthraquinone/HNO₃ | Salt (parts) | (a) yield: percent [1] | Reacted amount, percent | (b) yield percent |
|---|---|---|---|---|---|---|---|---|---|---|---|---|
| 8 | 20.8 | 167 | 98 | 25 | 98 | 45 | 16 | 1:3.9 | | 46 | | 40 |
| 9 | 20.8 | 167 | 100 | 25 | 98 | 45 | 16 | 1:3.9 | | 60 | | 50 |
| 10 | 20.8 | 167 | 101.5 | 33.4 | 98 | 45 | 18 | 1:5.3 | | 74 | | 71 |
| 11 | 20.8 | 167 | 99.5 | 20.8 | 98 | 45 | 18 | 1:3.3 | | 46 | | 36 |
| 12 | 20.8 | 167 | 99.5 | 46 | 98 | 45 | 18 | 1:7.8 | | 67 | | 58 |
| 13 | 20.8 | 167 | 100 | 41.8 | 98 | 45 | 20 | 1:6.6 | | 70 | 99 | 62 |
| 14 | 20.8 | 167 | 100 | 41.8 | 98 | 45 | 16 | 1:6.6 | | 76 | | 65 |
| 15 | 20.8 | 154 | 100 | 43.3 | 98 | 45 | 20 | 1:6.9 | (9) Na₂SO₄ | | 50 | |
| 16 | 104 | 836 | 101.5 | 210 | 98 | 45 | 15 | 1:6.6 | (9) NH₄NO₃ | 75 | 100 | 65 |
| 17 | 104 | 668 | 100 | 149 | 98 | 45 | 16 | 1:4.72 | | 56 | 80 | 48 |
| 18 | 104 | 752 | 100 | 167 | 98 | 45 | 16 | 1:5.3 | | 68 | 65 | 63 |
| 19 | 104 | 836 | 100 | 186 | 98 | 45 | 16 | 1:5.9 | | 69 | | 63 |
| 20 | 104 | 836 | 100 | 186 | 98 | 50 | 16 | 1:5.9 | | 75 | | 65 |
| 21 | 104 | 836 | 101.5 | 210 | 98 | 43 | 16 | 1:6.6 | | 75 | | 66 |
| 22 | 104 | 836 | 103.5 | 210 | 98 | 45 | 9 | 1:6.6 | | 73 | | 66 |
| 23 | 104 | 836 | 101.5 | 210 | 98 | 45 | 11 | 1:6.6 | | 73 | | 68 |
| 24 | 13 | 50 | 85 | 75 | 98 | 73 | 32 | 1:6.6 | | | 40 | |
| 25 | 52 | 418 | 101.5 | 74 | 98 | 60 | 20 | 1:6.6 | (40) NH₄NO₃ | 69 | 95 | 66 |

[1] Theory 1-nitroanthraquinone.

References Cited

UNITED STATES PATENTS 3,488,397   1/1970   Hakansson et al. _____ 260—64 S

OTHER REFERENCES

Beilstein: Band 7, p. 791 (1925).
Groggins: Unit Processes in Organic Synthesis, pp. 60–4 (1958).

ROBERT GERSTL, Primary Examiner